United States Patent [19]

Macedo et al.

[11] 4,110,093

[45] * Aug. 29, 1978

[54] METHOD FOR PRODUCING AN IMPREGNATED WAVEGUIDE

[76] Inventors: Pedro B. Macedo, 6100 Highboro Dr., Bethesda, Md. 20034; Theodore A. Litovitz, 904 Devere Dr., Silver Spring, Md. 20903

[*] Notice: The portion of the term of this patent subsequent to Feb. 17, 1993, has been disclaimed.

[21] Appl. No.: 635,728

[22] Filed: Nov. 26, 1975

Related U.S. Application Data

[63] Continuation-in-part of Ser. No. 462,481, Apr. 22, 1974, Pat. No. 3,938,974, and Ser. No. 559,512, Mar. 18, 1975, abandoned.

[51] Int. Cl.$^2$ .................. C03C 17/02; C03C 15/00; G02B 5/14
[52] U.S. Cl. .................. 65/3 R; 65/30 R; 65/31; 65/60 D; 65/DIG. 7
[58] Field of Search ............ 65/31, 60 D, 60 R, 30 R, 65/3 R, DIG. 7

[56] References Cited

U.S. PATENT DOCUMENTS

| | | | |
|---|---|---|---|
| 2,336,227 | 12/1943 | Dalton | 65/31 |
| 2,355,746 | 8/1944 | Nordberg et al. | 65/31 |
| 2,522,524 | 9/1950 | Lukes | 65/31 |
| 3,650,598 | 3/1972 | Kithno et al. | 65/30 R |
| 3,864,113 | 2/1975 | Dumbaugh et al. | 65/60 D |
| 3,938,974 | 2/1976 | Macedo et al. | 65/30 R |

FOREIGN PATENT DOCUMENTS

189,988   5/1967   U.S.S.R. .................. 65/31.

*Primary Examiner*—S. Leon Bashore
*Assistant Examiner*—Frank W. Miga
*Attorney, Agent, or Firm*—George J. Neilan

[57] ABSTRACT

The present invention relates to a glass composition for forming glass articles suitable for forming or being converted to articles or devices for use in the guided transmission of light, for both imaging and communications purposes. Base glass compositions are purified by phase separation, leached to remove impurities, and dopants are then deposited into interconnected pores of porous glass in such a fashion that properties of the glass are varied, e.g., for optical purposes, the index of refraction is controlled.

43 Claims, 5 Drawing Figures

METHOD FOR PRODUCING AN IMPREGNATED WAVEGUIDE

The invention herein described was made in the course of or under a contract or subcontract thereunder (or grant) with the Department of Defense.

This application is a continuation in part of our co-pending applications, Ser. No. 462,481 filed Apr. 22, 1974 now U.S. Pat. No. 3,938,974, and Ser. No. 559,512 filed Mar. 18, 1975 now abandoned.

This invention relates to novel glass compositions and to glass articles particularly suitable for forming or being converted to articles or devices for use in the guided transmission of light both for imaging and communication purposes. It is particularly suitable for forming glass articles which are subsequently drawn into glass fibers for use as optical fibers used to transmit and guide electromagnetic energy above 300 GHz; or for forming glass articles to be used to couple said electromagnetic energy between two or more optical fibers (or bundles of optical fibers), or couple said electromagnetic energy between optical source or detectors of said electromagnetic energy; or for forming glass articles to be used as a part of an integrated optical device; or for forming a glass article to be used as an active element in a laser or optical amplifier; or for forming a glass article to be used as a lens; or for forming a glass article to be used to relay images. In this disclosure the term glass waveguide will be used to embody the above and other similar uses. Such waveguides can be made with care with any desired attenuation from the order of 2-5 dB/km to 100 and upwards. For integrated optics applications, values of attenuation as high as 1 dB/cm are acceptable, though for purposes such as telecommunications, a level of less than 5 dB/km is necessary. The term "glass article" as used in these specifications includes articles which are to some extent crystalline.

In our previous U.S. Pat. No. 3,938,974 we have described a process in which a phase-separable glass is converted to a porous form. This porous form is substantially formed of silica and can then be converted to a solid glass article with either a uniform or non-uniform refractive index profile across at least one cross-sectional axis, by adding refractive index modifying components to the porous material, and collapsing the article thus formed into a solid glass article. We have called the process of adding such refractive index modifying components "molecular stuffing."

We have found that such a process is not only applicable to the stuffing of porous matrices produced by the leaching of phase-separated glasses, but is also applicable to other inter-connective porous structures having a matrix constituted of at least one glass network forming material. One well-known process for forming interconnective porous structures other than the phase separation route is by chemical vapor deposition. A convenient description of such a process is contained in U.S. Pat. No. 2,272,342, issued to J. F. Hyde and U.S. Pat. No. 2,326,059 issued to R. E. Nordberg. More particularly, U.S. Pat. No. 3,859,073 issued to P. C. Schultz describes the formation of a porous body and its subsequent impregnation with a dopant. Such impregnation is concerned with the deposition of small quantities of materials from relatively dilute solutions in the pores of the porous body.

In order to achieve a particular refractive index change and a particular refractive index profile, it is necessary to deposit relatively large quantities of material in the porous matrix. We have found that in order to obtain greater control of the desired refractive index profile it is essential to carry out certain steps of the process in a particular way and in a particular sequence not previously disclosed in order to achieve greater control of the desired profile in the finished article.

As indicated above, our prime purpose in adding a material to the pores is to obtain a particular refractive index or refractive index variation in the glass article. By this means one can produce an article suitable for use, e.g., as an optical waveguide. If the refractive index is constant throughout the article, the article is suitable for use as a core to be surrounded by a material of different lower refractive index as a cladding. The same effect can be produced in cross-section without a cladding by producing a stepped profile in an article. A "parabolic" profile is a term used to describe the situation where there is a refractive index gradient in any transverse cross-section such that the index decreases "progressively" or "continuously" from the central axis toward the periphery of the article. Various desirable profiles produced by other means have been described, e.g., in U.S. Pat. No. 3,830,640 issued to Nippoh Selfoc KK. In any process for forming the glass articles of this invention, the formation of the porous matrix constitutes a value added step and losses (for example, breakage) after this stage may decrease the economic yield of a full-scale commercial process. We have found it difficult to determine the factors causing losses either through breakage, due to cracking, or the occurrence of light scattering centers such as inclusions or bubbles in the final collapsed article.

To obtain both increased yields and more control over refractive index profile consistently and satisfactorily, we have now identified and improved those stages of the process where it is necessary to operate in a particular manner, and in a particular sequence not previously disclosed.

With regard to yield, as in the normal manufacture of any glass article modifications to the process do not necessarily result in every article cast or formed being fault free and ensure that such articles will all survive the subsequent processing steps. By an increased yield we mean that we have found how to improve the statistical chances of a rod or other article surticle surviving the processing steps. This is, however, on a statistical basic and one cannot guarantee that even when all the essential steps of our process are used, an acceptable product will always be obtained. As indicated previously, the improvement produced is not only in yield but in insuring that a desired refractive index profile is obtained consistently and satisfactorily.

This is primarily based on our discovery that for best results it is essential that the step of depositing the solid material in the pores be carried out by a process which does not involve evaporation of solvent, and that the subsequent heating step to raise the temperature of the article so as to remove the solvent from the pores, and, where necessary, decomposition products should be regulated so as to achieve retention or production of a desired refractive index profile.

We have also found that while achieving a satisfactory article, certain dopants give particularly advantageous results because of their physical characteristics.

We also prefer that, if the porous article to be stuffed has been made by phase separation from a glass followed by leaching, certain precautions be taken to reduce losses during the processing of the rod. We have found that cracking in this form of our process can be caused by problems arising from one or more of the following:
(a) Incorrect glass composition;
(b) Incorrect heat treatment conditions for phase-separation; and
(c) Incorrect leaching procedure.

Guidance is given below as to how to choose glass composition and processing conditions so as to reduce loss due to cracking in subsequent processing both during the formation of the porous matrix and the subsequent stuffing and drying.

The present invention is concerned with a method of producing a desired refractive index distribution in a glass article as a function of its dimensions by the addition of a refractive index modifying component (hereinafter referred to as a dopant) to a porous matrix with interconnective pores whose walls are formed from at least one glass network forming component and, where desired, glass network modifying components. The method comprises the steps of immersing the porous matrix in a solution of a dopant, causing the dopant to separate in the matrix, removing solvent and, where necessary, decomposition products from the porous matrix and collapsing the porous matrix to a solid form, characterized in that part or all of the dopant is caused to be precipitated by a method which does not involve evaporation of solvent, the removal of solvent is not commenced until a substantial part of the precipitation has taken place and the rate at which heat is applied to remove solvent, and where necessary, decomposition products is regulated so as to achieve and/or retain the desired refractive index distribution profile within the glass article.

The steps and the sequence of steps which we have found suitable to produce a particular profile are outlined below, all starting with a porous article having interconnected pores.

The steps of our invention comprise the following:
(1) The dopant is precipitated in the pores by non-evaporative steps. These include (a) thermal precipitation in which by lowering the temperature of the object, the solubility of the dopant or dopant compound in the solvent is decreased sufficiently to cause precipitation of the dopant or dopant compound and (b) chemical precipitation such as alteration of solution pH to a point of precipitation, replacement of the original solvent by a solvent in which the dopant or dopant compound is less soluble or introduction of a chemical into the solution which reacts with original dopant or dopant compound to form a less soluble dopant species. Hereinafter the term solvent is used to describe the chemical species which at some stage is the liquid filling the pores.
(2) Removal of the final solvent is commenced only after precipitation is substantially complete.
(3) The rate at which heat is applied to remove solvent and where necessary, decomposition products, is regulated so as to achieve and/or retain the desired refractive index profile within the glass article.

The steps and the sequence of steps which we have found suitable to produce particular profiles are outlined below, starting with a porous article and using thermal precipitation of dopant or dopant compound.

Flat profile
(a) Immerse the porous matrix in a solution of dopant or dopant compound.
(b) Precipitate the dopant by a temperature drop.
(c) Evaporate any solvent present.
(d) Heat to collapsing temperature.

Stepped profile
(1) (a) Immerse the porous matrix in a solution of dopant or dopant compound.
  (b) Precipitate the dopant by dropping the temperature.
  (c) Immerse in a solvent for the dopant and allow the dopant to partially redissolve and diffuse out of the matrix. Only the dopant precipitated near the outer surface of the article is removed in this step.
  (d) Evaporate any solvent.
  (e) Heat to collapsing temperature.
(2) Alternatively:
  (a) Immerse the porous matrix in a solution of dopant or dopant compound.
  (b) Precipitate the dopant by dropping the temperature.
  (c) Partially dry the porous rod.
  (d) Immerse in a solvent for the dopant and allow the dopant to partially redissolve and diffuse out of the matrix. Only the dopant precipitated near the outer surface of the article is removed in this step.
  (e) Evaporate any solvent.
  (f) Heat to collapsing temperature.

Parabolic profile
(a) Immerse the porous matrix in a solution of dopant or dopant compound.
(b) Immerse in a solvent for the dopant at substantially the same temperature as that at which stuffing took place. The article remains in the solvent for a sufficient time to produce a diffusion created profile of dopant in the article such that the dopant concentration decreases as a function of radial distance from the central axis.
(c) Precipitate dopant in pores by dropping temperature.
(d) Evaporate the solvent.
(e) Heat to collapsing temperature.

As indicated above, we prefer to use as a dopant a material whose solubility characteristics are such that we can achieve the desired concentration of the dopant in the pores, by diffusing a solution of the dopant into the pores at one temperature and then cause its precipitation by a simple drop in temperature. We refer to such a process as thermal precipitation. While we prefer to use this process, other routes are feasible. Our invention therefore includes a process for the production of a glass article with a desired refractive index distribution using a suitable porous matrix as a starting material in which a refractive index modifying component is caused to separate out of solution by lowering the temperature of the solution.

Amongst other routes we find we can precipitate the solute by chemical means rather than by temperature drop. The common ion effect has been used to reduce solubilities and cause precipitation of the solute (e.g., the solubility of $CsNO_3$ in water is reduced in the presence of $1N\ HNO_3$). The exchange of solvents has also been used to reduce solubilities and thus precipitation by means not involving evaporation of solvent can be used. These include the addition of a suitable precipitant which reacts with the dopant or causes a suitable change in pH. We have also used a combination of steps consisting of both thermal and chemical precipitation means. This is particularly useful in cases in which more than one dopant or dopant compound is being introduced into the pores. We avoid any precipitation methods involving evaporation of solvent as the sole means of precipitation, since we have been unable to obtain consistent results using such methods. We believe this is due to the following factors.

In the direct evaporative process the solution evaporates from the surface of the article causing transport of the dopant from the interior to the surface. There is also a vertical transport process due to gravity which causes accumulation of the dopant at the bottom of the article. Together these effects tend to produce undesirable profiles.

It is essential to regulate the rate of heating so as to avoid destroying either the incipient refractive index profile, or damaging the interconnective pore structure. It is possible by allowing the evolution of vapor or gas in an uncontrolled manner to produce a pressure sufficient to destroy the integrity of the structure. We prefer therefore to avoid allowing the solvent to reach its boiling point at a point when large volumes of vapor are liable to be produced. Various heating regimes are described below, and show how to regulate the heating to achieve a desired end.

The regulation of the solvent removal step is based on the need to avoid destruction of the integrity of the porous structure, and upsetting the distribution of the dopant in the pores. The precautions we take are to commence solvent removal at room temperature or below by a non-boiling method, and avoid any violent change in temperature which would cause an excessively fast evolution of solvent vapor in a confined space. Convenient methods of commencing solvent removal include placing the article, where the solvent is water, in a dessicator at about 22° C for about 24 hours, or in a vacuum at temperatures slightly above 0° C (i.e., 4° C) for about 4 hours, and then to proceed to raise the temperature. We have also found that it is necessary in some cases to hold or reduce the heating rate to a very low rate so that the article stays in a particular temperature range for a time sufficient to ensure particular events have occurred before heating is continued. At other points we believe it preferable to move rapidly from one temperatue to another, e.g., when solvent removal has been completed to the temperature of collapse. Later in this specification we give some guidance in terms of an aqueous system, but the warnings given can be seen to apply equally to the system where organic solvents or other non-aqueous systems or mixtures of such systems are used.

The following criteria can be used to select a suitable dopant from among the larger group of refractive index modifying components.

(a) It must be soluble in suitable concentrations in a solvent which does not interfere with subsequent processing after stuffing.

(b) It must be able to be incorporated into the matrix either as deposited or after thermally induced decomposition.

(c) The dopant or mixture of dopants used must be capable of being incorporated into the glassy structure at or below the highest temperature at which the article is subsequently processed.

(d) The dopant must not change its physical or chemical state in such a way before collapse as to be lost from the matrix.

(e) For low optical loss items the following added conditions apply:

(1) the dopant when used must be sufficiently free of iron, copper, and other undesirable transition metal elements.

(2) when the porous matrix is collapsed, the immiscibility temperature for the composition then formed must be below the temperature of any subsequent forming or shaping process needed to convert the article to any other shape or form.

Well-known compounds modifying the refractive index of glasses include those of Ge, Pb, Al, P, B, the alkali metals, the alkaline earths and the rare earths in the form of oxides, nitrates, carbonates, acetates, phosphates, borates, arsenates and other suitable salts in either hydrated or unhydrated form. Of these we prefer to use compounds of Cs, Rb, Pb, Ba, Al, Na, Nd, B and K. Other dopants and mixtures of dopants can be used as long as the above criteria are satisfied. It is impossible to list all the potential combinations of dopant elements but it is believed that based on the guidance given, such selection of useful comninations is within the competence of those practiced in the art.

The concentration of the dopant or dopant mixtures in the finished waveguide will usually vary with position. However, it is highest at the optical axis and it should be in the range 1–20 mole percent of the oxide of the dopant or dopant mixtures in the total glass composition, the preferred range being 2–15 and the most preferred, 5–10 mole percent. As a result the silica content of the glass will be greater than 75 mole percent, preferred greater than 80 mole percent, most preferred greater than 90 mole percent, the difference between the silica and dopant concentration usually being made up by $B_2O_3$.

In the selection of solvents the following considerations are important. The solvent selected (a) should not damage the porous matrix;

(b) should be capable of being purified to low concentrations of undesirable impurities;

(c) should be one that can be substantially removed by either exchange with another solvent, evaporation, or thermal decomposition followed by oxidation (or high temperature reaction with chemically active atmospheres);

(d) should have sufficient solubility for the dopant compound or combination of dopant compounds to allow the desired dopant levels within the pores to be achieved by molecular stuffing.

(e) should be such that, if used in thermal precipitation process, any dopant solutions in the solvent will have sufficiently high temperature dependence of solubility to deposit dopant within the pores when cooled;

(f) should be such that, when used to precipitate by a solvent exchange process, will have the specific solubility properties as needed by the process;

(g) should be, for economic considerations, low cost and capable of high speed of drying.

It is impossible to test all possible combinations of solvents; however we have found that water, alcohols, ketones, ethers, mixtures of these and salt solutions in these solvents can be used satisfactorily applying the above criteria to the selection of a particular solvent.

In general, we prefer to use thermal precipitation because of its ease and convenience, and because we prefer to carry out the first stage of the subsequent solvent removal step after doping at room temperature or below, and hence it is usually necessary to cool the stuffed article.

The dopants used are preferably water soluble and have a steep solubility coefficient, that is, that the material is very soluble at temperatures of the order of 100° C, and on cooling to room temperature or below, a substantial amount of material separates, thus making them suitable for thermal precipitation. The dopant should also be easy to purify, i.e., to reduce the iron and transition metal content to negligible proportions.

Further detailed guidance concerning the choice of solvent is given by reference to Table I below in which the solubility of various dopants in solvents at different temperatures are illustrated.

As already indicated above, in choosing a particular route to a desired end product, a number of guidelines need to be considered, and these can be illustrated by reference to Table I.

First, in order to obtain the desired concentration of dopant in the article to yield a significant change in index, a solution having a sufficiently high concentration of dopant must be found by suitable choice of dopant compound, solvent and temperature. In order to precipitate the dopant or dopant compound, the use of solvents with sufficiently low solubility is necessary. Often there is a need to remove substantial amounts of dopant from designated areas of the article, such as in the cladding region of a fiber, in which case solvents with intermediate solubilities are useful. Such removal of dopant is referred to as unstuffing, as opposed to molecular stuffing. Suitable control of solubilities for proper precipitation of the dopant or dopant compound can be achieved by a number of methods.

(1) Thermal precipitation is most suitable for solvents whose solubility for the dopant or dopant compound is strongly temperature dependent. Thermal precipitation has the added advantage of being able to arrest diffusion in the shortest time, thus enabling us to freeze-in a desired concentration profile with high accuracy.

This is illustrated for $CsNO_3$ dopant in Table I whereby the solubility changes from a desirable stuffing level at 95° C to a desirable unstuffing level at 4° C.

(2) Precipitation by common ion effect and thermal precipitation. Precipitation can be produced or further enhanced by the common ion effect. For example when the dopant is a nitrate the concentration of nitrate ions in solution is increased by adding another source of nitrate ions to the solvent (i.e., $HNO_3$ acid). This reduces the solubility of the nitrate dopant (see $CsNO_3$, Table 1)

(3) Precipitation by solvent exchange. Precipitation is induced by substituting a low solubility solvent for a higher solubility solvent. The high solubility of nitrates in water has allowed us to use water as solvent for the stuffing process. Exchange of water with either alcohols, ketones or ethers or combinations has induced precipitation of the dopants. Typical solubilities are illustrated in Table I.

(4) Variation in dopant compound. The range of solubility of the dopant compounds may be altered by choosing a different anion such as replacing $CsNO_3$ by $Cs_2(CO_3)_2$ to increase solubility in water (see Table I, line 7).

LEGENDS

As indicated above, when operating the process of the present invention with a porous interconnective structure which has been produced by the phase separation of a suitable glass followed by a leaching step, it is necessary to optimize the various stages of the process in order to achieve consistently and satisfactorily a saleable end product in good economic yields, and to interrelate the various parameters involved.

TABLE I

| | Compound | Solubility gr/100 ml sol. | $H_2O$ | methanol | ethanol | 1-propanol | diethyl ether | $HNO_3$ | Temp. (° C) |
|---|---|---|---|---|---|---|---|---|---|
| 1. | $CsNO_3$ | >100 | 100% | | | | | | >95 |
| 2. | " | 10 | 100% | | | | | | 4 |
| 3. | " | 4 | | | | | | 1 Normal | 4 |
| 4. | " | 1 | 30% | 70% | | | | | 4 |
| 5. | $CsNO_3$ | 10 | 70% | 30% | | | | | 22 |
| 6. | " | 1 | 15% | 85% | | | | | 22 |
| 7. | $Cs_2CO_3$ | >100 | 100% | | | | | | 22 |
| 8. | " | 10 | | 95% | | | 5% | | 22 |
| 9. | " | 1 | | 52% | | | 48% | | 22 |
| 10. | $Pb(NO_3)_2$ | >100 | 100% | | | | | | >70 |
| 11. | " | 10 | 30% | 70% | | | | | 22 |
| 12. | " | 1 | 5% | 95% | | | | | 22 |
| 13. | $La(NO_3)_3$ | >100 | 100% | | | | | | 22 |
| 14. | " | 10 | | | 15% | | 85% | | 22 |
| 15. | " | 1 | | | 10% | | 90% | | 22 |

| | Compound | Solubility gr/100 ml sol. | $H_2O$ | Methanol | Ethanol | Diethyl ether | $HNO_3$ | Temp. (° C) |
|---|---|---|---|---|---|---|---|---|
| 16. | $Nd(NO_3)$ | 20 | | | 10% | 90% | | 22 |
| 17. | " | 1 | | | 7% | 93% | | 22 |
| 18. | $Ba(NO_3)_2$ | 32 | 100% | | | | | 95 |
| 19. | " | 10 | 100% | | | | | 22 |
| 20. | " | 5 | 100% | | | | | 0 |
| 21. | $Al(NO_3)_3$ | 63.7 | 100% | | | | | 22 |
| 22. | $H_3BO_3$ | 27.6 | 100% | | | | | 100 |
| 23. | " | 6.35 | 100% | | | | | 22 |

The factors on which guidance is required by the man practiced in the art are:
(1) selection of glass composition and heat treatment to obtain suitable phase separation;
(2) leaching and washing;
(3) stuffing;
(4) unstuffing where needed; and
(5) drying and consolidation.

The guidance given in steps (3–5) above applies to all matrices, not just those produced from a phase separated glass.

1. Glass composition, time and temperature of heat treatment.

In order to achieve a satisfactory product it is necessary to choose a phase-separable composition, which on heat treatment at a particular temperature separates into approximately equal volume fractions, and when held at that temperature, develops an interconnective structure with a desirable pore size. A number of guidelines can be given to the man practiced in the art. We find it convenient to choose compositions from the area of alkali metal borosilicate glasses, and further guidance is given below as to suitable compositions.

Many compositions have been reported as suitable for use in the production of porous glasses for diverse purposes (see U.S. Pat. Nos. 2,106,744; 2,215,036; and 2,221,709 usually not for optical use by a route based on phase separation and leaching of the soluble phase. We have discovered that for optical waveguide manufacture, only small regions within prior art compositions ranges are suitable. U.S. Pat. No. 3,843,341 is one representative disclosure of such compositions which for the most part are not satisfactory in a process in which the articles produced are usually rods or other elongated shapes with the smallest dimension above 4 mm. For example, a number of glasses from within the preferred region of U.S. Pat. No. 3,843,341 and from previous disclosures of Corning (see Table II below) were vertically drawn into 8 mm rods at a rate of one inch per minute. These were phase separated as disclosed herein, but all the Table II compositions cracked during leaching.

TABLE II

Prior Art Compositions which Crack upon Leaching*

| $Na_2O$ | $B_2O_3$ | $SiO_2$ | $Al_2O_3$ |
|---|---|---|---|
| 8 | 30 | 62 | 0 |
| 8 | 35 | 57 | 0 |
| 8 | 40 | 52 | 0 |
| 10 | 30 | 60 | 0 |
| 10 | 35 | 55 | 0 |
| 10 | 40 | 50 | 0 |
| 10 | 30 | 59 | 1 |
| 10 | 35 | 54 | 1 |
| 10 | 40 | 49 | 1 |

*All concentrations are in units of mol percent.

More specifically, we have found that
(1) All of the compositions in the range of the sodium borosilicate system disclosed in U.S. Pat. No. 3,843,341 and drawn into rods as described above, cracked upon leaching. This includes the region denoted as the preferred range in said patent.
(2) Many of the compositions in the range of the sodium alumina borosilicate disclosed in U.S. Pat. No. 3,843,341 cracked when treated as described above. This was true even for compositions in the preferred range.
(3) Many of the preferred compositions disclosed in the U.S. Pat. No. 2,221,709 cracked when treated as described above.

Although we find most of the previously disclosed borosilicate range of composition unsatisfactory because of the requirements we need to insure a satisfactory yield of end product, we have discovered certain specific compositions in this broad range which are useful and which have not been previously described. In addition we have discovered a set of criteria which can be applied to identify other specific limited areas of phase-separable glass compositions which would give a satisfactory yield of product.

From a commercial point of view, and because of the large region of phase separation which they show it is most convenient to work with alkali borosilicate glasses through almost all silicate glassy systems exhibit composition regions of phase separation.

In order to achieve a satisfactory product it is necessary to choose a composition:
(1) which on suitable heat treatment separates into two phases, one silica-rich, the other silica-poor. The latter is preferentially soluble in a suitable solvent.
(2) which on heat treatment at a particular temperature separates into phases of approximately equal volume fractions and when held at that temperature develops interconnected microstructure.
(3) which is easy to melt and is easy to refine using conventional techniques.
(4) which is relatively easy to form in the shape of a rod or a shaped article with minimum dimensions of > 4 mm (e.g., thickness, diameter, etc.) and does not phase separate significantly during the forming stages.

The following provides a systematic procedure for selecting a suitable composition.
(1) Almost all silicate glassy systems exhibit composition regions of phase separation. However, of commercial interest are the alkali borosilicate glasses which show a large region of phase separation. The silica-poor phase of these glasses can be readily dissolved by simple acidic solutions. Frequently it is necessary to add other components such as aluminum oxide to modify certain properties of these glasses. However, some oxides are not desirable because on phase separation they end up in the silica-poor phase and make it difficult to dissolve by simple acidic solutions. Thus only those other components are suitable which do not diminish the solubility of silica-poor phase significantly.
(2) After deciding on the glassy system (along with dopants), one should next determine the immiscible regions of composition, C, and their coexistence temperatures, Tp. Tp (C) is the temperature above which a glass (C) is homogeneous. Techniques for determining Tp are well described in literature (see for example W. Haller, D. H. Blackburn, F. E. Wagstaff and R. J. Charles, "Metastable immiscibility surface in the system $Na_2O$-$B_2O_3$-$SiO_2$" J. Amer. Ceram. Soc. 53 (1), 34-9 (1970)).
(3) We have discovered that one should determine those compositions, $C_1$, which exhibit an equilibrium volume fraction of about 50% at least at some heat treatment temperature. We shall denote this temperature by $To(C_1)$. The method for determination of this temperature is as follows:
(a) Select three (or more) temperatures, say $T_1$, $T_2$ and $T_3$ (about 50° apart from each other) such that $$T_3 < T_2 < T_1 < Tp(C_1)$$

Carry out long heat treatments on glass samples until they turn white at temperatures $T_1$, $T_2$ and $T_3$.
  (b) by electron microscopy of these heat-treated samples measure volume fractions, V(T), of one of the phases (the same phase should be selected for all samples) for each of the samples.
  (c) Make a plot of volume fraction V(T) against heat treatment temperature, T. By interpolation (or extrapolation) determine the temperature for which the volume fraction will be 50 55)% (i.e., temperature $To(C_1)$).

(4) Knowing Tp(C) and $To(C_1)$, one should determine the composition range $(C_2)$ within the range $C_1$ such that
  (a) 575° C $\geq$ To $(C_2)$ $\geq$ 500° C and
  (b) 750° C $\geq$ Tp $(C_2)$ $\geq$ 600° C.

These temperatures are selected so as to give not over long heat treatment times; other ranges can of course be selected if one is willing to accept long heat treatment times of a week or more.

(5) The composition range, $C_2$, is further narrowed by the requirement that, during melting, it should be easily refinable. This demands that the high temperature viscosity of the melt should be sufficiently low. We shall call this sub-range of $C_2$, $C_3$ (i.e., all glasses belonging to $C_2$ which, in addition, refine properly). We have found for example that one convenient feature identifying some of the refinable glasses is that those containing at least 28% $B_2O_3$ refine satisfactorily.

(6) Not all compositions of $C_3$ are desirable even though they will refine easily, and will phase separate with 50% volume fraction. An additional requirement is that the desired composition should not phase separate significantly during forming operation. The degree of phase separation in the forming process is influenced by the viscosity characterics of the glass in the region at and below the co-existence temperature, and also the dimensions of the article being formed, and rate at which it can be cooled.

In order to determine those compositions, $C_4$, which do not appreciably phase separate upon cooling through and below the co-existence temperature, articles with dimensions of the order of the size of preforms useful for further drawing into optical waveguides are cooled at rates sufficiently low to prevent the build-up of large thermal stresses. The degree of phase separation occurring within these articles can then be determined. Those compositions within the area $C_3$ which do not phase separate in this forming process can then be grouped in the further restricted area $C_4$. The compositions fulfilling this condition preferably have a Tp between 710° and 600° C, most preferably between 695° and 640° C.

(7) The final criterion we apply insures that there is sufficient composition difference between the two phases when separated that leaching will take place effectively. For this purpose we select only those compositions C* which within the $C_4$ range satisfy the condition that $$Tp(C^*) - To(C^*) \geq 75° C$$

Having found the desired composition range C*, any composition, Co, can be selected within it. The suitable heat treatment temperature and time for this particular composition Co can then be found by the following procedure.

(a) The heat treatment temperature of Co is set equal to To(Co), i.e., the temperature at which the volume fraction of the two phases will be equal. If C* has been properly chosen according to the above criteria, this temperature will not be so low that the time needed to obtain a suitable microstructure for leaching would be too long and uneconomic. Similarly, it will not be too high otherwise
  [1] distortion of the glass may occur during heat treatment;
  [2] if the temperature of heat treatment is well above say, over 160 centigrade degrees above the glass transition temperature, phase separation tends to be rapid which reduces the degree of control on phase separation. These requirements limit our preferred heat treatment temperature, $T_H$, to the following range $$575° C > T_H(Co) = To(Co) > 500° C$$

(b) Having found $T_H(Co)$, the heat treatment is determined by the condition that a microstructure state suitable for leaching is developed.

Heat treatments at different times are carried out say $t_1$ (1hour) $< t_2$ (2 hours) $< t_3$ (3 hours) . . . . By electron microscopy, it is possible to determine the time, $t_{max}$, beyond which the interconnectivity of the structure begins to break down. The size of the leachable phase is measured from micrographs, and the preferred heat treatment times are those which are less than $t_{max}$ but for which the microstructure size is at least 150 Å, and preferably less than 300 Å.

We have applied the above criteria within the alkali borosilicate system and have identified certain characteristics of the composition ranges which contribute to good yields of the fiber optic preforms which are at least 2 mm in diameter, avoiding the problems arising from, e.g., phase separation during forming, or insufficient phase separation when the phase separation stage is being carried out. Phase separation during forming of the glass article from the melt, and insufficient phase separation or breakdown of the interconnective structure during the phase separation heat treatment can both cause or contribute to cracking during either or both of the following steps, leaching of the phase separated glass, and drying of the leached and stuffed glass.

It has become clear to us that the compositions associated with the best yields are those contained within the following broad composition area (all percentages being in mol percent):

|  | Broad | Preferred |
|---|---|---|
| $SiO_2$ | 48–64 | 49.5 – 59 |
| $B_2O_3$ | 28–42 | 33–37 |
| $R_2O$ | 4–9 | 6.5 – 8 |
| $Al_2O_3$ | 0–3 | 0–2.0 |
| $\rho$ | 0–1.0 | 0.20–0.8 |
| $\alpha$ | 0–3 | 0–2.4 |
| $\lambda$ | 0–0.5 | 0 |
| x | 0.1 – 1.0 | 0.2 – 0.8 | where $\alpha$ is the $Al_2O_3$ concentration in mole percent, $x = \rho + 1/3\alpha - \lambda$ and is defined as the ratio $A_2O/R_2O$ for $A_2O$ and $R_2O$ in mole percent, $A_2O$ is the sum of the concentrations in mole percent of $K_2O$, $Rb_2O$ and $Cs_2O$; and $R_2O$ is the sum of the concentrations in mole percent of $Li_2O$, $Na_2O$, $K_2O$, $Rb_2O$, and $Cs_2O$; and $\lambda$ is the ratio $Li_2O/R_2O$.

Because of the presence of $Al_2O_3$ in the glass significantly affects the results, we will first discuss glasses which have no $Al_2O_3$ content. Under these conditions, the ranges listed above are appropriate with $Al_2O_3$ content of zero, with $R_2O$ the sum of all the alkali metal oxides $Li_2O$, $Na_2O$, $K_2O$, $Rb_2O$ $Cs_2O$ and the broad range for $\rho$ limited between 0.1 and 1.0. If the concentrations of $K_2O$ is zero, then the upper limit of the range for $\rho$ should be 0.8.

Lithium glasses tend to devitrify and therefore it is often preferable not to use that chemical. In this case, $R_2O$ becomes the sum of the concentrations of $Na_2O$, $K_2O$, $Rb_2O$ and $Cs_2O$. All limits and conditions above are maintained.

Rubidium and cesium glasses are more expensive than those made with sodium and potassium. They can be left out for economic reasons. Then $R_2O$ becomes the sum of $Na_2O$ and $K_2O$. All limits and conditions above are maintained.

When more than 0.5 mole percent $Al_2O_3$ is present in the glass, the broad range of $R_2O$ is taken between 6 and 9 mole percent.

The most economically favorable compositions with $Al_2O_3$ consist of $R_2O$ having $Na_2O$ and $K_2O$ only, or $R_2O$ can also consist of $Na_2O$ only.

The glasses below in Table III are glasses which we have identified using the above criteria and found satisfactory for use in the molecular stuffing process of the present invention as we achieve a satisfactory control of phase separation and pore structure after leaching using these compositions, and a good overall yield of finished product of the invention.

inner untreated layer goes into tension because of the thickness of the swollen outer layer.

We have found that the rate of leaching, and the redeposition of borates in the pores of the glass during leaching can be controlled by controlling the concentration of borate salts in the acid leaching solution.

We have measured leaching rates at 95° C for glass rods (length 10 cm, diameter 8 mm, and composition 57% $SiO_2$, 35% $B_2O_3$, 4% $Na_2O$ and 4% $K_2O$) heat treated for 1 ½ hours at 550° C with leaching solutions containing 327.3 gm of $NH_4Cl$, 33.6 ml of HCl per liter of water and varying amounts of $B_2O_3$. We found that leaching time increased with increasing $B_2O_3$ content in the leaching solution. The results are summarized below:

TABLE IV

| Amount of Boric Acid (g/liter) | Leaching Time (minutes) |
|---|---|
| 0 | 425 ± 50 |
| 41.2 | 625 ± 50 |
| 61.5 | 642 ± 50 |
| 84.7 | 725 ± 50 |
| 106.1 | 1670 ± 50 |

We believe redeposition of borates in the pores also contributes to rod breakage. This can be avoided by e.g. replacing the leaching solution as the concentration of borate builds up. But this requires large quantities of leaching solution. For example, in order for leaching time to be no more than 660 minutes, the volume of leaching solution per 100 ml of glass will be on the order of 1550 ml. This, however, can increase costs and provide a possible source of contamination. We find it more

TABLE III

| | Leachable Compositions | | | | | | | | | | |
|---|---|---|---|---|---|---|---|---|---|---|---|
| | $SiO_2$ | $B_2O_3$ | $Na_2O$ | $K_2O$ | $Rb_2O$ | $Cs_2O$ | $Al_2O_3$ | $\rho$ | $\alpha$ | $\lambda$ | $x$ | $T_p$ |
| I | 63 | 30 | 5 | 2 | 0 | 0 | 0 | 0.29 | 0 | 0 | 0.29 | — |
| II | 63.7 | 29.4 | 6.3 | 0.6 | 0 | 0 | 0 | 0.10 | 0 | 0 | 0.10 | — |
| III | 61.2 | 34 | 2 | 2.8 | 0 | 0 | 0 | 0.58 | 0 | 0 | 0.58 | 646 |
| IV | 60.7 | 35.1 | 2 | 2.2 | 0 | 0 | 0 | 0.52 | 0 | 0 | 0.52 | — |
| V | 59.7 | 33 | 5.4 | 1.9 | 0 | 0 | 0 | 0.26 | 0 | 0 | 0.26 | 678 |
| VI | 59.3 | 34.3 | 1.6 | 4.8 | 0 | 0 | 0 | 0.75 | 0 | 0 | 75 | 633 |
| VII | 58.4 | 34 | 5.6 | 0 | 2 | 0 | 0 | 0.26 | 0 | 0 | 0.26 | 687 |
| VIII | 59.1 | 34 | 4.9 | 0 | 0 | 2 | 0 | 0.29 | 0 | 0 | 0.29 | 687 |
| IX | 57.7 | 35 | 5.7 | 0 | 0 | 0 | 1.6 | 0 | 1.6 | 0 | 0.53 | — |
| X | 56 | 36 | 4 | 4 | 0 | 0 | 0 | 0.50 | 0 | 0 | .50 | 670 |
| XI | 56 | 36 | 6 | 2 | 0 | 0 | 0 | .25 | 0 | 0 | .25 | 710 |
| XII | 53 | 38 | 8 | 0 | 0 | 0 | 1.0 | 0 | 1.0 | 0 | .33 | 681 |

Another aspect of our invention involves leaching of borosilicate phase separable glasses. We prefer before leaching the glass to etch the article to be leached with dilute hydrofluoric acid for about 10 seconds to remove any surface contamination, or surface layer of glass having a slightly different composition from the interior due to volatilization of components such as $B_2O_3$ or $Na_2O$ during formation.

The concentration of the acid solution, amount of leaching solution and temperature of leaching have a direct bearing on the progress of leaching. It is essential to insure that a sufficient quantity of the leaching solution is brought into contact with the article to dissolve the soluble phase. The rate of leaching may be conveniently controlled by adjusting the temperature. The glass should be above 80° C, preferably above 90° C. As has previously been described in U.K. Pat. No. 442,526, it is desirable to use an acid solution which has been saturated with $NH_4Cl$ or other equivalent compounds capable of reducing the concentration of water in the acid leaching solution. This assists in controlling any swelling of the treated layer and reduces considerably the chances of loss due to cracking of the article, as the convenient to provide a cold trap so that excess material is continuously removed from the solution as it comes into solution from the article being leached. The cold trap is effective in speeding the process even if it is only a few degrees below the temperature of the glass article. Preferably it should be 20° C below the temperature of the glass article. We find it convenient when $NH_4Cl$ is present to choose a temperature for the cold trap at which the acid solution remains saturated with $NH_4Cl$. It is possible to operate with a low level of rod breakage without $NH_4Cl$ or other equivalent compounds present in the leaching solution. In general we prefer to use at least 10 weight percent $NH_4Cl$, preferably 20 weight percent as we find that on a statistical basis there is an even lower level of rod breakage when $NH_4Cl$ is present.

The most convenient way to determine a suitable leaching time is to take an article and subject it to the leaching treatment measuring the mass of the article at intervals of time until little or no further weight loss is observed.

The article, once leached, is conveniently washed with deionized water. With certain compositions there can be deposition of silica gel in the pores, and we find this can be removed by washing with NaOH. We have found it possible by selection of compositions to minimize this deposition. The compositions shown in Table III alleviate this problem, especially those with minimum silica.

Once the porous matrix has been produced, either from a phase-separable glass as outlined above, or by, e.g., a chemical vapor deposition technique, the selection of suitable conditions for stuffing and unstuffing we have found can be made by following the guidelines given below.

Using well-known formulas for optical waveguides, the desired physical properties of the waveguide (such as size, numerical aperture, band pass, etc.) can be related to a variation of index as a function of its dimensions. The dependence of refractive index on dopant and dopant compound concentration can be determined by literature search or by suitable experiments. From these, the maximum concentration of dopant or dopant compound needed in the article is determined. Sufficient dopant or dopand compound must then be dissolved in the stuffing solution so that the desired concentration is reached at a particular stuffing temperature and time of stuffing. The following procedure enables these parameters to be determined:

(1) Determination of Stuffing Temperature of Porous Rod (a) Determine the dependence of the solubility of the dopant or dopant compound in the appropriate solvent on temperature.

(b) The stuffing temperature range lies between the temperature at which the desired concentration of dopant or dopant compound is saturated in solution from (a) and the boiling temperature of the solution.

(2) Determination of Stuffing Time of Porous Rods

The stuffing time depends not only on the concentration, temperature, and the composition of dopant solution, but also on the microstructure size in the porous rod. The procedure given here is for a given set of dopant solution, temperature and microstructure of porous rods. For a change in any of these variables, the procedure should be repeated, or suitably modified according to our guidelines.

(a) Measure the diameter ($a_o$) of a porous rod and immerse it in the dopant solution.

(b) Monitor its weight as a function of time.

(c) Determine the time, $t_o$, beyond which the weight does not increase significantly by plotting the fractional weight change, $y(t) = [M(t) - M(o)]/[M(\infty) - M(o)]$ versus time, t, where M(o), M(t), and M($\infty$) are the respective weights initially, at time t and at infinity (very long times).

(d) Time required to stuff, t, another porous rod of diameter a, with the same dopant solution at the same temperature is $$t = t_o [\frac{a}{a_o}]^2$$

EXAMPLE

Figure 1:
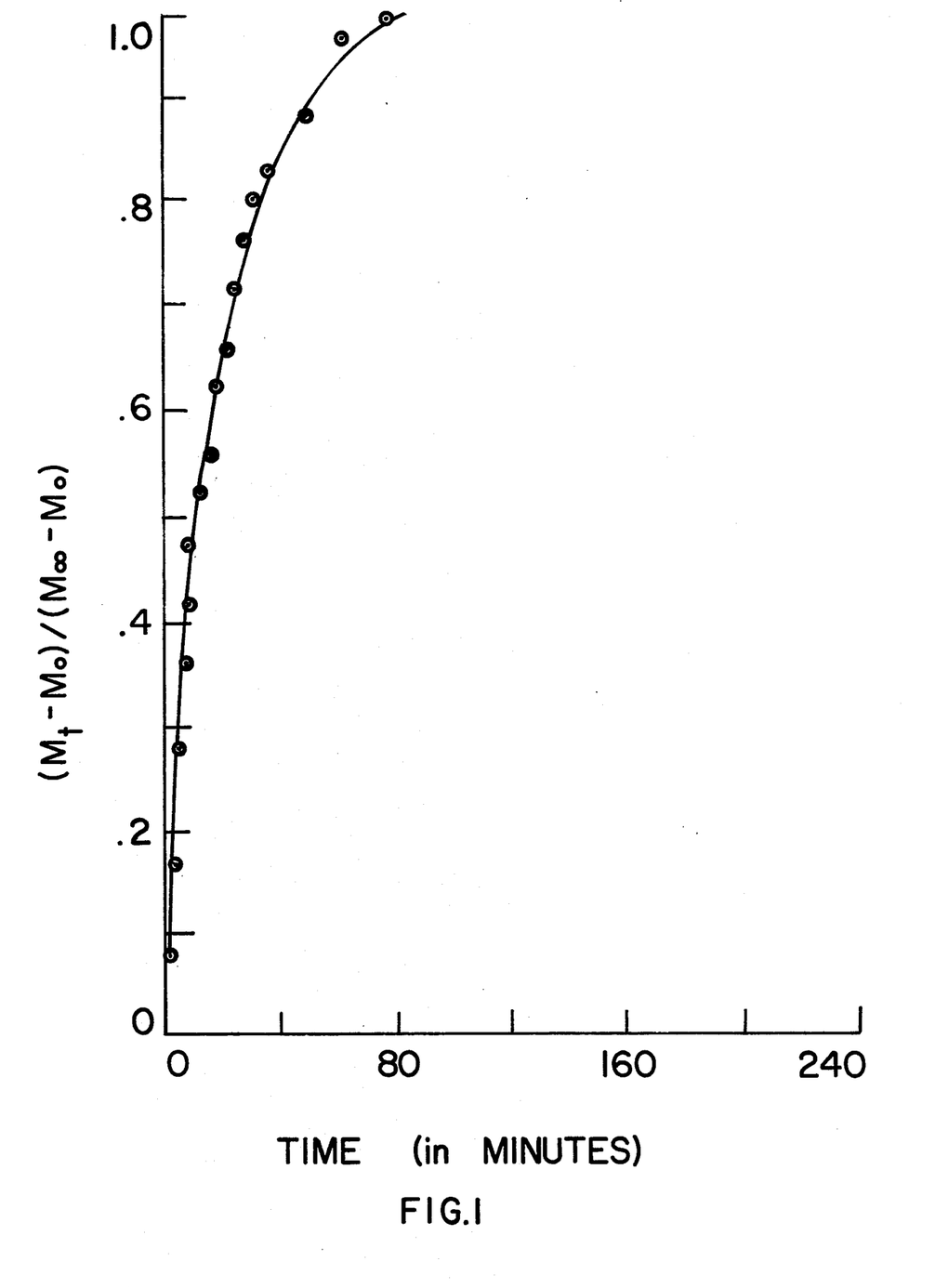
FIG. 1. Plot of the fractional weight gained by a porous rod immersed in a solution of $CsNO_3$ at 100° C.

We stuffed a porous rod with a concentrated solution of $CsNO_3$ in water (120 g $CsNO_3$ per 100 ml of solution) at 100° C. The radius of the rod was 0.42 cm. We measured the weight gain as a function of time. The results are shown in FIG. 1. It can be seen that after about 200 minutes the weight of the rod does not increase significantly. Thus, the proper stuffing time for this rod is about 4 hours.

(3) Determination of Unstuffing Time to Produce a Parabolic Profile in a Porous Rod by Thermal Precipitation To produce a parabolic profile, the stuffed rod, produced as (2) above, is partially unstuffed by immersing it in the solvent. This should be done at a temperature where the dopant does not precipitate. The unstuffing time depends on the temperature as well as on the microstructure of the porous rod. The procedure described here is for a given temperature of stuffing and microstructure.

(a) Carry out an unstuffing study at the temperature at which the rod was stuffed by monitoring the weight change as a function of time while the rod is immersed in solvent.

(b) Plot the fractional change y(t)

$$y(t) = \frac{M(t) - M(o)}{M(\infty) - M(o)} \quad (1)$$

against time t.

(c) The time of unstuffing, $t_o$, depends on the desired profile; often it is $$\tfrac{1}{3} \leq y(t_o) \leq \tfrac{2}{3}$$

EXAMPLE

Figure 2:
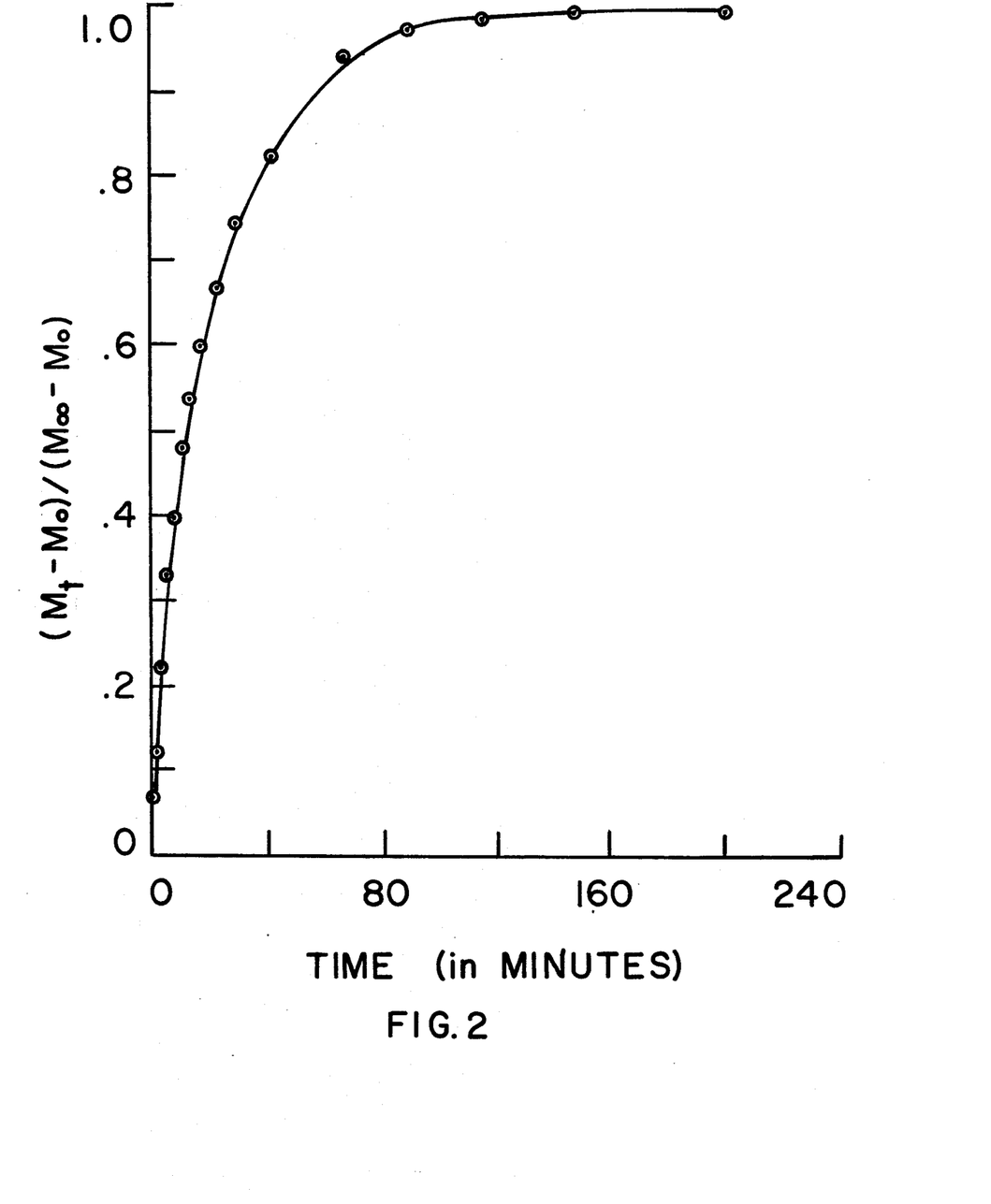
FIG. 2. Plot of the fractional weight loss by a porous rod after being stuffed with $CsNO_3$ at 100° C, which is now immersed in $H_2O$ at 100° C.

We chose a porous rod stuffed with concentrated $CsNO_3$ solution (120 g $CsNO_3$ per 100 ml solution) at 100° C as described above. We then unstuffed the rod in water at 100° C monitoring its weight loss as a function of time. The results are shown in FIG. 2. The range of unstuffing times can be calculated from the graph.

(4) Determination of Unstuffing Temperature and Time to Produce a Step Profile by Thermal Precipitation The temperature for unstuffing for a step index-type fiber depends on the numerical aperture desired in the fiber and on the dopant solution. Since one would like to have as low a refractive index in the clad as possible, the unstuffing temperature is typically a few degrees above the freezing point of the dopant solution.

The time required for unstuffing depends on the desired clad thickness, as well as on such parameters as temperature of unstuffing, the concentration of the stuffing solution previously used and the size of microstructure in the porous rod. The procedure described here is for a given set of these variables. In case of a change in the values of any of these parameters, the entire procedure should be repeated, and adjusted according to the guidelines herein.

Suppose the desired clad thickness is "d" and the radius of the stuffed rod is a($>$d). Let $$Y = 2\frac{d}{a} - (\frac{d}{a})^2$$

Knowing Y, it is possible to determine the proper unstuffing time by following the procedure described here.

(a) Carry out an unstuffing study in the desired solution at the desired temperature by monitoring the fractional weight change y(t) as a function of time.

Figure 3:
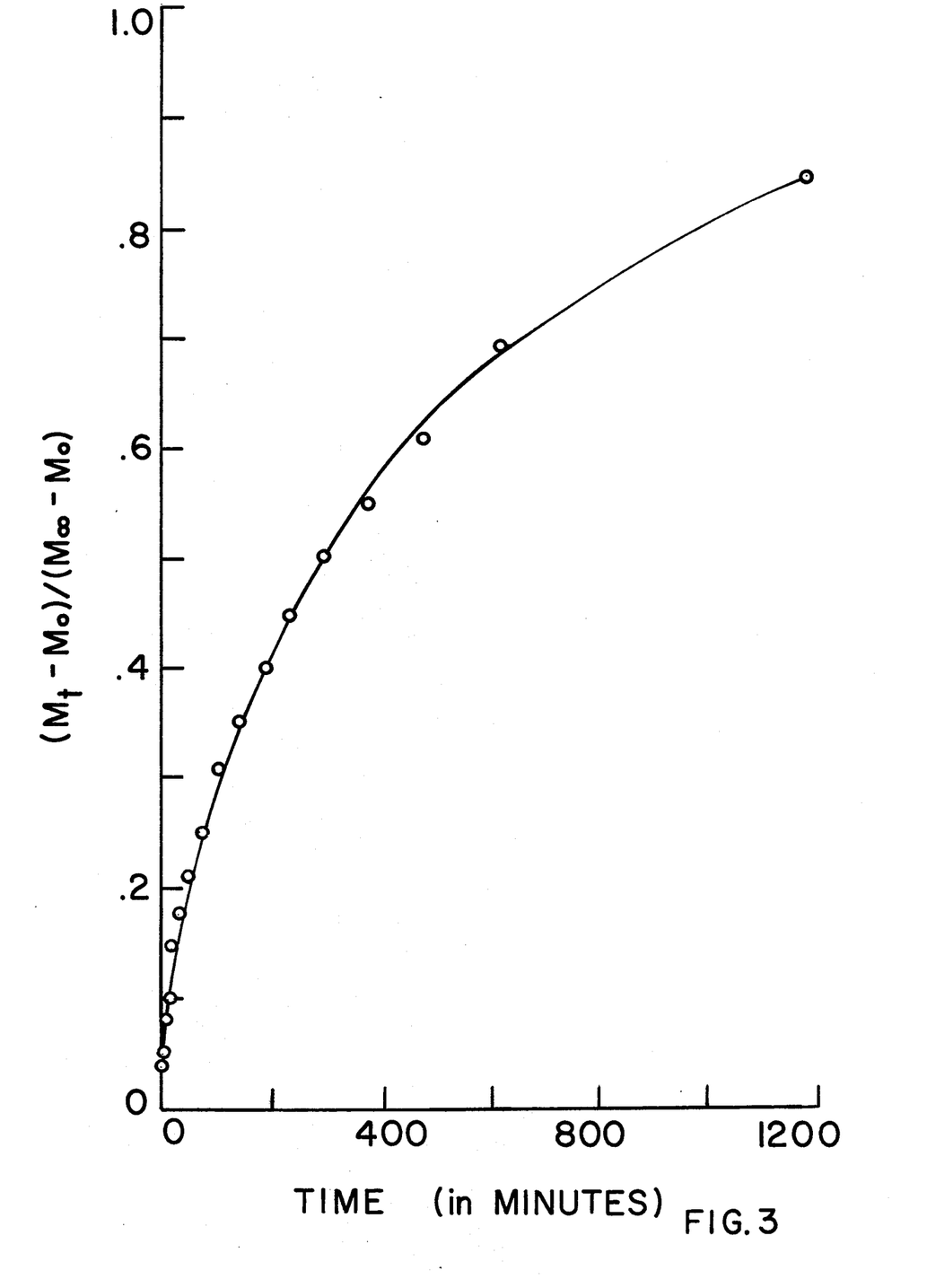
FIG. 3. Plot of the fractional weight loss by a porous rod after being stuffed with $CsNO_3$ at 100° C, which is now immersed in $H_2O$ at 4° C.

(b) Plot the fractional weight change against time, (see eq. 1) as shown in FIG. 3.

(c) Find time $t_o$ for which $$y(t_o) = Y$$

from the above plot. This is the desired unstuffing time.

The practical application of the use of the unstuffing procedure is in most cases to reduce the concentration of dopant in the outer layers of the article so as to attain a desired refractive index profile.

This can be done as indicated above by, e.g., when the actual stuffing has been completed with a saturated solution of a dopant at 95° C, replacing the dopant solution by the solvent used free of dopant at the same temperature, or where the system is aqueous, water or dilute nitric acid. The dopant then tends to diffuse outwards, thus varying the concentration through the cross-sectional area of the porous matrix. The time required for this "unstuffing" is of course dependent upon the volume being treated, but a rod of diameter 8 mm requires about 20 to 30 minutes. We prefer to stop the unstuffing by replacing the liquid surrounding the rod with cold solvent, or in the case of an aqueous system, water at a temperature approaching freezing point or ice-cold nitric acid. In the case of an aqueous system we have also found it possible to control the end point by measuring the change in conductivity of the water being used to unstuff.

(5) Drying, i.e., Removal of Solvent

Two problems occur in drying which affect the economics of the process and the quality of the product. These are cracking of the porous glass structure and changes in the dopant concentration profile. Cracking is a statistical problem and it is possible to have samples survive the process regardless of the drying procedure. However, in order to operate on a commercial scale, it is necessary to adopt a procedure which minimizes cracking and thus improves the economics of the process. Such a procedure should also preferably avoid profiles being altered in such a way that dopant is transferred from the interior of the article toward the surface as this is not usually a desirable profile. This results in a depression of index in the center and an increase near the edges as illustrated in Example VII. As indicated above, the profile obtained is dependent on the unstuffing. Having achieved a suitable profile with solvent still present in the porous structure, it is essential to dry, i.e., remove solvent in a way which will not alter that profile to an undesirable state.

In an analysis of the drying process we have found that a number of events affect the process. These are:

(a) Gas evolution. The sources of gases can be the solvent, dopant decomposition products and dissolved gases. If the gas evolution is too fast because of rapid heating or insufficient gas removal the resulting differential pressures in the pores can break the glass and/or carry dopant from inside of the article.

(b) Size change. As the bulk of the solvent is removed from the porous glass, the surface layer may remain chemically bonded to the glass. We have observed this effect with water and found the layer to persist up to high temperatures. This may also occur with other solvents. As this layer is removed, the sample shrinks. With sufficient shrinkage difference across the porous structure stresses can be developed to the point of cracking.

(c) Dopant compound decomposition. The dopant as available in solution is generally a compound which thermally decomposes. We have chosen dopant compounds which decompose before the collapsing temperature. This decomposition step is generally accompanied by a large evolution of gases. It is generally desirable to control the heating rate while going through the temperature range where decomposition occurs in order to prevent cracking and transport of dopant.

(d) Mass transport can occur at several points in the drying process. When the article is dried initially, dopant which remains in solution can be transported to the surface and deposited there as the solvent is evaporated. If the solvent evaporates violently or boils even precipitated dopant can be displaced. After decomposition, if the dopant crystals are small, they may be carried through the gas phase. If the dopant has a significant vapor pressure, dopant redistribution through the vapor phase may occur. If dopant becomes a liquid it may redistribute according to gravity.

(e) Hydroxyl ion removal. Hydroxyl ions form absorption bands in the near infrared which often are detrimental to use as a waveguide. If one wants to remove the hydroxyl ion because of this or any other reason, the following complications arise. A significant amount of hydroxyl ions are found to be entrapped in the glass and can only be removed during prolonged heat treatments at high temperatures. However, in the same temperature range collapse begins to occur trapping hydroxyl ions in the glass.

Outlined below is a preferred process for the suitable solution of these problems. The initial bulk removal of the solvent has to be performed by the use of conditions where boiling does not occur; in the case of equious solutions, we have used two procedures. One consists of initially drying the porous glass articles with precipitated dopant in a dessicator (at atmospheric pressure) for 24 hours at 22° C and then placing them in a drying oven. The second consists of placing the article under vacuum at temperatures below 10° C and above the freezing point of the solution. We have found 4° C for 24 hours to be convenient when using $CsNO_3$ in aqueous solution as a dopant. In order to minimize the chances of cracking even further, we find that when using aqueous solvents, it is convenient to subject the article to a final wash with a non-aqueous solvent which is non-reactive with the glass. We believe this can assist in removing hydroxyl ions from the structure. An example of a suitable solvent is methyl alcohol.

We have found it preferable to warm the articles which have been maintained below 10° C under vacuum slowly to room temperature and to maintain under vacuum at room temperature conveniently for about 24 hours before the articles are transferred to a drying oven.

In the case of non-aqueous solutions of dopants, we have found it suitble to place the articles under vacuum at room temperature for 24 hours and then transfer to a drying oven. This significantly speeds up the process as compared to an aqueous process.

In the drying oven, we have found it desirable to heat the samples to the upper drying temperature under vacuum at a rate below 30° C/hour, preferably 15° C/hour, since a slow heating rate significantly lowers the cracking probability and avoids dopant redistribution.

The selection of a suitable slow heating rate will be dependent on the economics of the process. It may in some circumstances be cost effective to accept a higher breakage rate in order to increase the rate of throughput of articles through a processing system. However, any increase in heating rate must also be balanced against the increased risk of destroying the desired refractive index profile in the articles which are not cracked. Example VII shows that at least with the dopant used in that example, this problem occurs at a heating rate of 50° C/hour.

The upper drying temperature depends upon the porous glass matrix. A suitable value can be found by first collapsing an undoped article and measuring its glass transition temperature, $T_g$. The upper drying temperature is then preferably chosen to be in the range between 50° and 150° C below the glass transition temperature. We prefer to use a narrower range of 75° to 125° C.

The next stage of drying consists of holding the glass at or about this upper drying temperature for periods of 5 to 200 hrs., preferably 40 – 125 hours. In this period, the glass may be held under vacuum or under a selected gas at atmospheric pressure. We have found it desirable to pass gas around the article since this helps the drying process. It should be noted that whatever the choice of drying conditions during the holding time, it is desirable to expose the sample to oxidizing conditions if one wants to lower the near infrared absorption and there are residual iron impurities in the glass. This oxidizing stage reduces the $Fe^{2+}/Fe^{3+}$ ratio in the glass, thus lowering the absorption by $Fe^{2+}$ ions. In our preferred procedure, we heat treat a porous glass article having a $T_g$ of 725° C at 625° C (100° C below the glass transition) for 96 hours while passing dry oxygen gas around the sample.

(6) Consolidation

Once the above drying process is complete, the article is not ready to be collapsed. The article is raised rapidly in temperature to the point where consolidation occurs. once the pores are collapsed, consolidation is complete and the article may be cooled back to room temperature. The consolidation step must be conducted at atmospheric pressure or below if the article is to be further worked by reheating above the consolidation temperature otherwise some gas evolution is likely to occur in reheating and bubbles are formed.

We have found it desirable where the matrix is produced from a phase-separable glass to heat the porous glass samples under a reduced pressure of oxygen (approximately 1/5 bar) up to 825° C where consolidation occurs.

The following examples illustrate the molecular stuffing aspect of the invention but do not limit the invention. Examples I to V illustrate the use of various concentrations of dopant in aqueous solutions in treating a porous matrix which result in a glass on consolidation with differing overall concentrations of dopant. The general procedure used for producing the porous matrix from a phase-separable glass and the subsequent treatment are shown in the paragraphs below and the actual numbered examples illustrate the use of different dopants at a range of concentration, collapsing temperatures and final overall glass composition.

MELTING AND FORMING

A glass having the composition in mol%; 4 $NaO_2$, 4 $K_2O$, 36 $B_2O_3$, 56 $SiO_2$ was melted and stirred to produce a homogeneous melt from which rods were drawn having a diameter in the range 0.7 to 0.8 cm.

HEAT TREATMENT USING A COOLING COIL

The drawn rods were heat treated at 550° C for 2 hours to cause phase-separation.

ETCHING BEFORE LEACHING

Each rod was etched for 10 seconds in 5% HF followed by a 30 second wash in water.

LEACHING

The rods were leached at 95° C with 3N HCl containing 20% $NH_4Cl$ by weight, the time being chosen on the basis of previous trials so as to reach a stage where the rate of weight loss has dropped to almost nil. The leaching time of the rods used in these examples was chosen to be in excess of 30 hours. During leaching, by providing a cold spot at 40° C, the boric acid concentration in the leaching agent was kept below 50 g/liter, this speeding up leaching and avoiding possible re-deposition of boron compounds in the pores of the matrix. 40° C is chosen so that there is no precipitation of $NH_4Cl$ from the leaching solution as this temperature is above the saturation temperature of the $NH_4Cl$ present to maintain a suitable amount in solution to reduce breakage drastically.

WASHING

The leached material is washed with de-ionized water The washing cycle is conveniently controlled by determining the concentration of iron in the effluent. Washing is conveniently carried out at room temperature using 10 volumes of water to 1 volume of glass. We prefer in a non-continuous process to change the water about 6 to 8 times, giving a washing time of about 3 days; at each change the iron concentration is reduced to 1/10th of its concentration at the time of addition of fresh washing water, and in this way one can assume without measuring the iron content that a sufficiently low level has been achieved during washing.

STUFFING

With aqueous solutions of dopants (see Examples I to VI below) we prefer to move smoothly from the last washing stage to stuffing by simply replacing the water by the stuffing solution. This is done by draining the water from the last wash and filling the tube containing the porous rod with stuffing solution.

In Examples I through IV, the samples were removed from the stuffing solution and cooled to 22° C where the dopant precipitated partially with an amount equivalent to its aqueous solubility at 22° C remaining in solution in the liquid filling the pores. (For example, 10 g Ba($NO_3$)$_2$/100 ml solution remained dissolved in water in the pores after thermal precipitation at 22° C. Similarly, 6 g $H_3BO_3$/100 ml solution remained dissolved in water in the pores.) The remainder of the dopant was precipitated during the drying procedure which was commenced by placing the porous article in an atmospheric pressure dessicator for 24 hours at 22° C. Drying was then continued under vacuum in a furance whose temperature was raised at 15° C/hour to the upper drying temperature (as defined above). This is determined in the manner described above and for the samples used in Examples I to VIII was 625° C.

HOLD TIME

The rods were then held at a temperature of 625° C for 96 hrs. while passing dry oxygen gas around the rods.

CONSOLIDATION

On completion of the hold time, the article is ready to be collapsed and is raised rapidly to a temperature where collapsing takes place and a consolidated rod is produced. This step is carried out under a reduced pressure of oxygen (approximately 1/5 bar) and the final temperature is given in each example.

EXAMPLE I

| Rod | Dopant gm/100 cc of $H_2O$ | Stuffing Time: Hours | Details Temp. °C | Consolidation Temp. °C | Composition Mole % | Wt% |
|---|---|---|---|---|---|---|
| | | | | Molecular Stuffing with BaO Dopant $Ba(NO_3)_2$ in Water | | |
| 1 | 12 | 4 | 85 | 820 | 6.0 $B_2O_3$ | 6.86 |
| | | | | | 93.11 $SiO_2$ | 91.10 |
| | | | | | .82 BaO | 2.04 |
| 2 | 18 | 4 | 85 | 820 | 6.0 $B_2O_3$ | 6.79 |
| | | | | | 92.73 $SiO_2$ | 90.18 |
| | | | | | 1.22 BaO | 3.03 |
| 3 | 24 | 4 | 85 | 830 | 6.00 $B_2O_3$ | 6.72 |
| | | | | | 92.35 $SiO_2$ | 89.28 |
| | | | | | 1.62 BaO | 4.01 |

EXAMPLE II

| Rod | Dopant gms/100cc of $H_2O$ | Stuffing Time Hours | Details Temp. °C | Consolidation Temp. °C | Composition Mole % | Wt% |
|---|---|---|---|---|---|---|
| | | | | Molecular Stuffing with $B_2O_3$ Dopant $H_3BO_3$ in Water | | |
| Comparison Rod | 0 | — | — | 820 | 6.09 $B_2O_3$ | 7 |
| | | | | | 93.88 $SiO_2$ | 93 |
| 4 | 12 | 4 | 85 | 815 | 7.73 $B_2O_3$ | 8.83 |
| | | | | | 92.27 $SiO_2$ | 91.17 |
| 5 | 18 | 4 | 85 | 815 | 8.51 $B_2O_3$ | 9.71 |
| | | | | | 91.49 $SiO_2$ | 90.29 |
| 6 | 24 | 4 | 85 | 810 | 9.28 $B_2O_3$ | 10.58 |
| | | | | | 90.72 $SiO_2$ | 89.42 |

EXAMPLE III

| | Molecular Stuffing with PbO + $B_2O_3$ Dopant $Pb(NO_3)_2$ and $H_3BO_3$ in Water |
|---|---|
| Rod # 7 | Doped with 40 gms $Pb(NO_3)_2$ and 10 gms $H_3BO_3$ per 100 cc of $H_2O$ at 85° C for 12 hours. Collapsed at 825° C. |

EXAMPLE IV

| | Molecular Stuffing with BaO + $B_2O_3$ Dopant $Ba(NO_3)_2$ and $H_3BO_3$ in Water |
|---|---|
| Rod #8 | Doped with 12 gms $Ba(NO_3)_2$ and 6 gms $H_3BO_3$ per 100 cc of $H_2O$ at 85° C for 4 hrs. Collapsed at 830° C. |

EXAMPLE V

Figure 4:
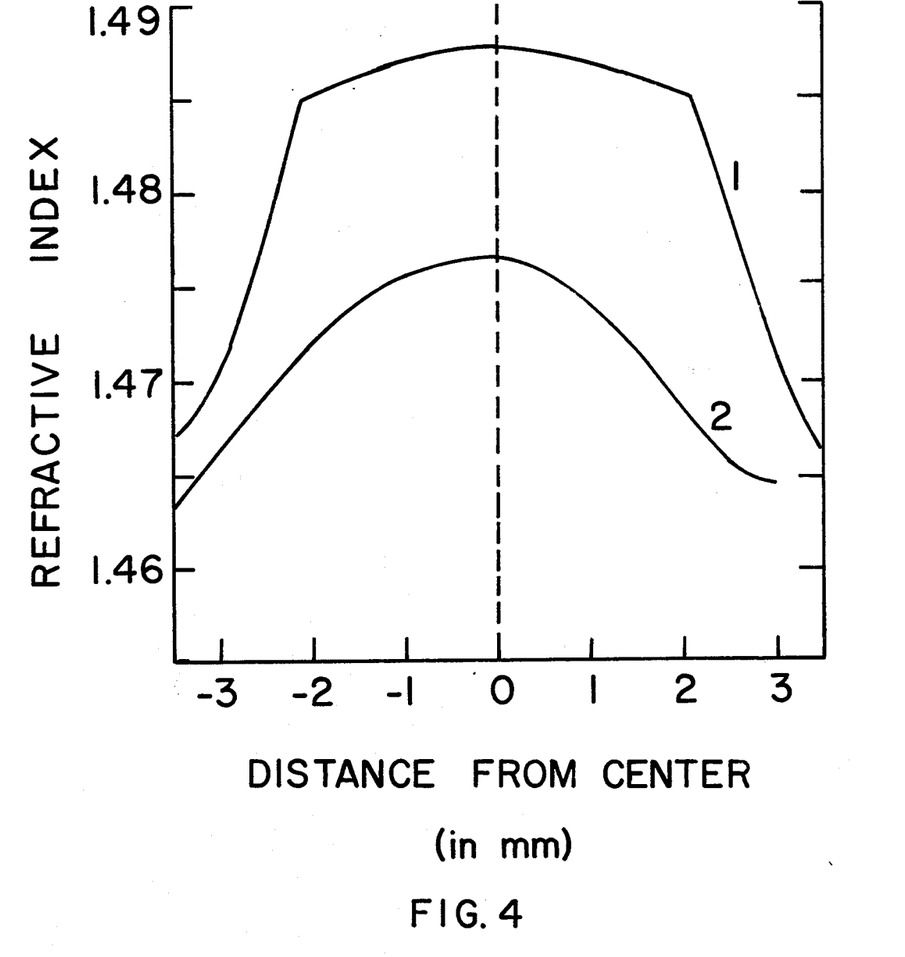
FIG. 4. Plot of the index of refraction profile of rods in Example V. Curves 1 and 2 indicate the rods unstuffed for 11 and 20 minutes respectively.

The above examples all relate to uniform doping of the rod. As described above, it is possible once a rod has been left for sufficient time to diffuse the dopant solution into the pores, to then reduce the concentration in the outermost part of the rod so as to achieve a refractive index profile in the collapsed rod. Two porous rods were produced by the procedure outlined above, and were immersed for more than 4 hours at 95° C in an aqueous solution of $Cs_{NO3}$ with a concentration of 120 g $CsNO_3$/100 ml solution. The rods were then transferred to water at 95° C, and left in the water for periods of 11, and 20 minutes respectively. Each rod at the expiration of the time in water was immersed in water at 0° C for 10 minutes to cause thermal precipitation of $CsNO_3$. The rods were then treated to remove solvent and collasped in the manner described above. The refractive index profiles obtained are shown in FIG. 4.

EXAMPLE VI

Figure 5:
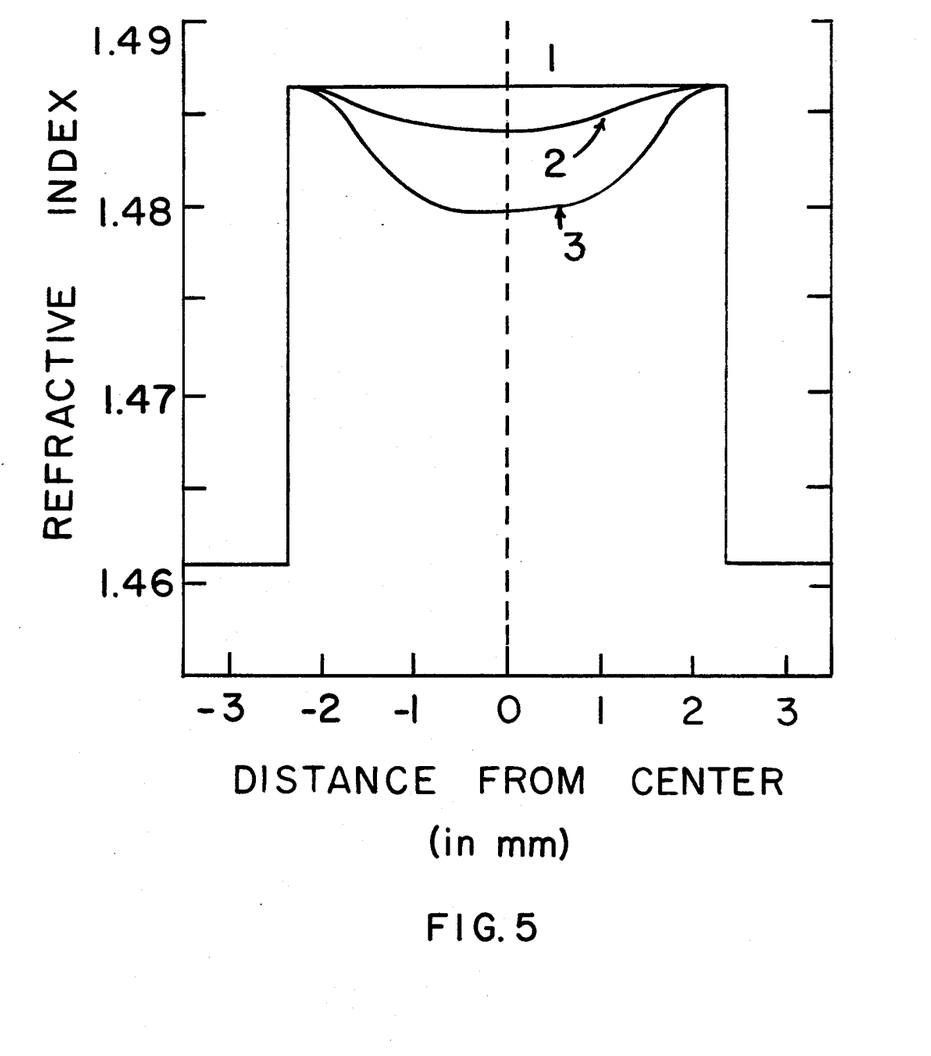
FIG. 5 Plot of the index profile stuffed according to rod #13, Example VI, Table V. The rods were rate heated according to Example VII where curves 1, 2 and 3 represent heating rates of 15, 30 and 50° C/hr. respectively.

Several porous rods produced by the method described above were immersed in a series of solutions of $CsNO_3$ and $Cs_2CO_3$ as per Table V below for more than 4 hours at 95° C. These were then unstuffed to produce a step profile. (The profile for rod #13 is shown in FIG. 5.) The time required for unstuffing was determined using FIG. 3 (i.e., for rod #13 the time for which $y(t_o) = 0.50$ is 300 min.). The stuffed rods were unstuffed by immersion in ice water for 300 min. and the water was removed and rods were collapsed as described above. The resulting index of refraction in the center of the rod is listed in Table V.

TABLE V

| Rod Number | Stuffing Solution | Index at center of rod |
|---|---|---|
| 9 | 20 grs $Cs_2CO_3$/100ml $H_2O$ | 1.462 |
| 10 | 30 grs $Cs_2CO_3$/100ml $H_2O$ | 1.475 |
| 11 | 75 grs $Cs_2CO_3$/100ml $H_2O$ | 1.488 |
| 12 | 60 grs $CsNO_3$/100ml aqueous solution | 1.475 |
| 13 | 120 grs $CsNO_3$/100ml aqueous solution | 1.486 |

EXAMPLE VII

As discussed previously, we emphasized the importance of drying at a slow rate between temperatures near 0° C and 600° C when using rods stuffed with dopants. Here we show an example of differences in index distributions due to different heating rates. Several stuffed porous rods as used in Example V were unstuffed to produce stepped profiles as in Example VI. After thermal precipitation, the rods were dried under vacuum at 4° C for 24 hours. They were then heated under vacuum at rates of 50, 30 and 15° C/hr respectively. The resulting index profiles are shown in FIG. 5. Heating at rates above 100° C/hr caused appreciable breakage in rods. Thus, the preferred heating rate is below 20° C/hr, when one does not want to alter the precipitated profile.

The rod heated at 15° C/hr was selected for fiber pulling. The rod preform is fed into the opposing flames of two gas oxygen torches and the melted tip of the preform is drawn manually into a fiber whose end is attached to a revolving drum which draws the fiber down to a 185 μ diameter. The drawn fiber is illuminated with a white light source with a spectral region selected by a 100 Å wide interference filter with transmission centered at 0.85 μ. An absorbent material is placed in contact with the fiber clad along a sufficient length to remove cladding modes. The transmission intensity I(1) is measured on a long fiber segment. All but 1 meter of the fiber is then removed and the transmission is again measured. The loss in dB/km is given by $$\text{Loss } (dB/km) = \frac{10}{1} \log \frac{I(l_1)}{I(l_2)}$$

where $1 = l_2 - l_1$ and $l_2$ and $l_1$ are the lengths in km of the long and short fiber segments respectively. It was found to be 25 dB/km.

EXAMPLE VIII

After leaching and washing as described above in the introduction to Examples I–IV, a stuffed porous rod is immersed for four hours in a solution containing 120 g of $Cs(NO_3)/100$ cc of solution at 95° C. The sample is cooled to 22° C where the dopant is partially precipitated. It is then dried in a dessicator for 24 hours at room temperature. The sample is uniformly stuffed and in order to introduce a profile, it is then washed at 4° C in water for 2 hours and then in 3N $HNO_3$ for 30 minutes. This is followed by drying in a vacuum at the same temperature. Once the bulk of the water is removed, it is slowly dried by progressively raising the temperature as described in our preferred procedure. At intermediate temperatures, the $CsNO_3$ decomposes into $Cs_2O$ and various nitrogen oxides. When the sample changes from white to clear, the consolidation is complete and the sample is removed from the furnace.

EXAMPLE IX

As indicated above, it is possible to vary widely the choice of dopant, solvent and conditions of operation during stuffing and unstuffing and the combinations and permutations of these parameters in order to achieve a desired end result, or modification of processing conditions. We have given guidance to the man practiced in the art; this example illustrates some of the permutations and combinations we have found satisfactory. The porous rods used were all produced by the general procedure described above and solvent removal and heating carried out under our preferred conditions.

The results obtained are given below in Table VI. The columns in this table give the following information:

| | |
|---|---|
| Column 1: | Dopant used. |
| Column 2: | Concentration of dopant/100 ml solution. |
| Column 3: | Solvent, i.e., solvent used for initial stuffing. |
| Column 4: | Temperature in ° C, and time taken for initial stuffing. |
| Column 5: | Solvent A- this is the solvent used to reduce the concentration and produce refractive index variation, and also to cause precipitation of the dopant. |
| Column 6: | Temperature in ° C and time taken for precipitation and variation in refractive index profile. |
| Column 7: | Solvent B is used where appropriate to adjust dopant distribution in matrix. By causing further precipitation before solvent removal begins so as to enable a more thorough decrease in dopant concentration near glass surface. |
| Column 8: | Temperature in ° C and time taken for adjusting dopant distribution by further solvent treatment. |
| Column 9: | Indicates temperature at which drying commenced in ° C, and by "V" or "A" whether drying in vacuum (V) or in dessicator at atmospheric pressure (A) for the first stage. |
| Column 10: | Gives the index of refraction where measured. |
| In the table, | |
| Line 1: | is the same as Rod #13 in Example VI above and is included for comparison with line 2, where by including a further treatment with methanol and water, while using the same stuffing solution, the difference in index is increased. |
| Line 3: | demonstrates how by replacing one compound by another, in this case $CsNO_3$ by $Cs_2CO_3$ because of higher solubility, stuffing can be carried out at room temperature. |
| Lines 4–9: | illustrate the use of different dopant and solvent combinations. |
| Lines 10 & 11: | show the use of a mixture of dopants. |
| Line 12: | illustrates the use of neodymium nitrate as a dopant, and of the use of an organic solvent. |

TABLE VI

| | Stuffing | | | Precipitation | | | | Drying | |
|---|---|---|---|---|---|---|---|---|---|
| Dopant | Weight per 100 ml solution | Solvent | Temp. & time | Solvent A | Temp. & time | Solvent B | Temp. & time | commence at (° C) | Index Of Refraction |
| 1. $Cs(NO_3)$ | 120 g | water | 95° C-16 hr | water | 0° C-3 hr | — | — | 4° C(V). | center 1.486 edge 1.464 |
| 2. $Cs(NO_3)$ | 120 g | water | 95° C-16 hr | water | 0° C -3 hr | 30% water 70% methanol | 0° C-3 hr | 4° C(V) | center 1.489 edge 1.458 |
| 3. $Cs_2(CO_3)$ | 50 g | water | 22° C-16 hr | 92% meth. 8% 1-propanol | 22° C-3 hr | 52% methanol 48% 1-propanol | 22° C-3 hr | 22° C(V) | 1.487 |
| 4. $Na(NO_3)$ | 17.5 g | water | 25° C- 4 hr | — | — | — | — | 25° C (A) | 1.465 |
| 5. $H_3BO_3$ | 18 g | water | 85° C-4 hr | water | 22° C 10 min | — | — | 22° C(A) | 1.457 |
| 6. $Pb(NO_3)_2$ | 40 g | water | 22° C-16 hr | 30% $H_2O$ 70% methanol | 22° C-3 hr | 5% water 95% methanol | 22° C-3 hr | 22° C(V) | 1.465 |
| 7. $La(NO_3)_3$ | 50 g | ethanol | 22° C-16 hr | 15% etha- | 22° C-3 hr | 10% etha- | 22° C-3 hr | 22° C(V) | |

TABLE VI-continued

| | Stuffing | | | Precipitation | | | | Drying | |
|---|---|---|---|---|---|---|---|---|---|
| Dopant | Weight per 100 ml solution | Solvent | Temp. & time | Solvent A | Temp. & time | Solvent B | Temp. & time | commence at (° C) | Index Of Refraction |
| 8. Ba(NO$_3$)$_2$ | 24 g | water | 85° C-4 hr | nol* 85% diethyl ether water | 22° C-3hr | nol* 90% diethyl ether — | — | 22° C(A) | |
| 9. Al(NO$_3$)$_3$ 9 H$_2$O | 60 g | water | 25° C-4 hr | — | — | — | — | 22° C(A) | + |
| 10. Ba(NO$_3$)$_2$ + H$_3$BO$_3$ | 12g 6g | water | 85° C-4 hr | water | 22° C-10 min. | — | — | 22° C(A) | + |
| 11. Pb(NO$_3$)$_2$ H$_3$BO$_3$ | 40 g 10 g | water | 85° C-12 hr | water | 22° C-10 min. | — | — | 22° C(A) | + |
| 12. Nd(NO$_3$)$_3$ | 20 g | 90% diethyl ether 10% ethanol | 22° C-16 hr | diethyl ether | 22° C-3 hr | — | — | 22° C(A) | 1.464 |

*In this case the stuffed rod was immersed in solution B for 1¼ hr, then in solutions A & B for 3 hrs. respectively.
+ These glasses scattered light when collapsed and turned clear when pulled into fibers.

Although presently preferred embodiments of the invention have been shown and described with particularity, it would be appreciated that various changes and modifications may suggest themselves to those of ordinary skill in the art upon being apprised of the present invention. It is intended to encompass all such changes and modifications as fall within the scope and spirit of the appended claims.

What we claim is:

1. In a method of producing an optical glass waveguide comprising adding at least one dopant capable of varying the index of refraction to a porous glass matrix with interconnective pores by immersing the porous glass matrix in a liquid/solution of the dopant to impregnate the porous glass matrix with the solution, precipitating the dopant from the solution within the porous glass matrix in the porous glass matrix, removing solvent from the porous glass matrix and collapsing the porous glass matrix to a solid form, the improvement which comprises precipitating the dopant within the matrix before substantial evaporation of solvent, drying to remove solvent from the pores to obtain after the steps of collapsing the porous glass matrix to a solid form an optical glass waveguide.

2. A process as in claim 1 where at most a nominal amount of solvent is evaporated prior to substantially all the dopant being precipitated.

3. A process as in claim 1 wherein an addition dopant is introduced.

4. A process as in claim 1, further comprising precipitating the dopant by changing the temperature of the impregnated porous glass matrix to decrease the solubility of the dopant within the solution and cause precipitation of the dopant within the porous glass matrix.

5. A process as in claim 1 where the dopant is caused to precipitate by reacting the dopant with a chemical to produce a less soluble dopant.

6. A process as claimed in claim 1 where the dopant is precipitated by exchanging solvents.

7. A process as claimed in claim 1 where the dopant is precipitated by the common ion effect.

8. A process as claimed in claim 1 in which the precipitation is immediately followed by removal of solvent.

9. A process as claimed in claim 1 where before heating to remove solvent, the porous glass matrix is immersed in further solvent in which the solubility of the dopant is substantially less than the solubility of dopant in the initial solvent to reduce the concentration of the dopant in an outer layers of the porous glass matrix.

10. A process as claimed in claim 1 where after immersion in dopant solution and before precipitation of the dopant, the article is immersed in a solvent for the dopant so as to vary the concentration of the dopant in the pores.

11. A process as claimed in claim 1 where the removal of solvent is carried out by the use of conditions where boiling does not occur.

12. A process as claimed in claim 1 where the removal of solvent is commenced in vacuum at temperature below room temperature.

13. A process as claimed in claim 1 where the solvent is water and the removal of solvent is started in a dessicator at or about room temperature.

14. A process as claimed in claim 13 where the article is held in a dessicator for a minimum of 24 hours.

15. A process as claimed in claim 1 where the solvent is water and is exchanged with an organic solvent before commencing the drying.

16. A process as claimed in claim 1 whereby after bulk solvent removal, the article is heated slowly at less than 100° C/hr up to a temperature 50° to 150° C below the glass transition temperature of the undoped consolidated glass used as a host.

17. A process as claimed in claim 16 where the preferential heating rate is below 20° C/hour.

18. A process as claimed in claim 16 where the article is under vacuum during heating.

19. A process as claimed in claim 1 where the article is held or heated at a negligible rate at the upper drying temperature which is a temperature in the range of 50° to 150° C below the glass transition temperature of the undoped consolidated glass used as a host.

20. A process as claimed in claim 19 where the upper drying temperature is 75° to 125° C below the glass transition temperature.

21. A process as claimed in claim 19 where the article is kept in an oxidizing atmosphere for at least part of the holding time.

22. A process as claimed in claim 19 where the holding time is between 5 and 200 hours.

23. A process as claimed in claim 21 where the holding time is between 40 and 125 hours.

24. A process as claimed in claim 1 in which after removal of solvent or any decomposition products is substantially complete, the porous article is raised to the temperature at which collapse takes place.

25. A process as claimed in claim 24 where the final increase in temperature is carried out at a pressure below atmospheric.

26. A process as claimed in claim 25 where an oxidizing atmosphere is present during the final increase in temperature to the temperature of collapse.

27. A process as in claim 1 where the dopant is selected from the compounds of Ge, Pb, Al, P, B, the alkali metals, the alkaline earths, and the rare earths in the form of oxides, nitrates, carbonates, acetates, phosphates, borates, arsenates and silicates in either hydrated or unhydrated form or mixtures thereof.

28. A process as in claim 27 where the dopants are selected from the compounds of Cs, Rb, Pb, Al, Na, Nd, B and K or mixtures thereof.

29. A process as in claim 27 where the dopant is a compound of Cs.

30. A process as in claim 27 there the dopant is $CsNO_3$.

31. A process as in claim 27 where the dopant is a compound of Nd.

32. A process as in claim 27, where 2 to 15 mole percent of dopant is incorporated in the glass.

33. A process as in claim 32 where 5 to 10 mole percent of dopant is incorporated in the glass.

34. A process as in claim 1 where the solvent is selected from the group consisting of water, alcohols, ketones, ethers, and mixtures of these solvents.

35. A process as in claim 34 where the solvent is an alcohol.

36. A process as in claim 35 where the solvent is water.

37. A method according to claim 1 where the porous glass is made by chemical vapor deposition.

38. A method according to claim 1, further comprising substantially completely precipitating the dopant from said solution of a dopant within the porous glass matrix.

39. A method according to claim 1, in which said dopant is cesium nitrate, and further comprising precipitating greater than about 90 percent of the cesium nitrate out of said solution of a dopant.

40. A method according to claim 1, further comprising after collapsing the porous glass matrix containing precipitated dopant to a solid form drawing said solid form into a fiber.

41. A process according to claim 1, further comprising changing the pH of the solution to cause precipitation of the dopant within the porous glass matrix.

42. A process according to claim 9, further comprising immersing doped porous glass matrix in a third solvent in which the solubility of dopant is substantially less than the solubility of dopant in the further solvent.

43. A process according to claim 9, further comprising commencing removal of the further solvent only after precipitation is substantially complete.

* * * * *